US011214386B2

United States Patent
Tajika et al.

(10) Patent No.: US 11,214,386 B2
(45) Date of Patent: Jan. 4, 2022

(54) SYSTEM, CONTROL DEVICE AND LIGHT AIRCRAFT

(71) Applicant: HAPSMobile Inc., Tokyo (JP)

(72) Inventors: Akihiko Tajika, Saitama (JP); Kiyoshi Kimura, Tokyo (JP); Takashi Motohisa, Tokyo (JP); Atsushi Yamamoto, Tokyo (JP)

(73) Assignee: HAPSMobile Inc., Tokyo (JP)

( * ) Notice: Subject to any disclaimer, the term of this patent is extended or adjusted under 35 U.S.C. 154(b) by 0 days.

(21) Appl. No.: 17/096,904

(22) Filed: Nov. 12, 2020

(65) Prior Publication Data

US 2021/0078730 A1 Mar. 18, 2021

Related U.S. Application Data

(63) Continuation of application No. PCT/JP2019/029852, filed on Jul. 30, 2019.

(30) Foreign Application Priority Data

Aug. 2, 2018 (JP) ............................. JP2018-145736

(51) Int. Cl.
*B64F 3/02* (2006.01)
*G05D 1/10* (2006.01)
(Continued)

(52) U.S. Cl.
CPC ............... *B64F 3/02* (2013.01); *B60L 8/003* (2013.01); *B64B 1/06* (2013.01); *B64B 1/50* (2013.01);
(Continued)

(58) Field of Classification Search
CPC ... B64F 3/02; B64F 1/36; B64D 47/02; B64D 27/24; B64D 2211/00; B64B 1/50;
(Continued)

(56) References Cited

U.S. PATENT DOCUMENTS 3,611,371 A * 10/1971 Morse ..................... G01S 13/62
342/29
4,039,220 A * 8/1977 Stoops ..................... B66C 1/36
294/82.2
(Continued)

FOREIGN PATENT DOCUMENTS

CN 102944135 A * 2/2013
CN 203078749 U * 7/2013 ................. B64F 1/36
(Continued)

OTHER PUBLICATIONS

Decision to Grant a Patent issued for counterpart Japanese Application No. 2018-145736, issued by the Japanese Patent Office dated Dec. 24, 2019 (drafted on Dec. 12, 2019).
(Continued)

*Primary Examiner* — Behrang Badii
*Assistant Examiner* — Jalal C Coduroglu

(57) ABSTRACT

Provided is a system comprising a projector; and a control device, wherein the control device includes a projector position information acquisition unit for acquiring projector position information indicative of a position of the projector, a flight vehicle position information acquisition unit for acquiring flight vehicle position information indicative of a position of a flight vehicle on which a solar cell panel is mounted, and an irradiation direction control unit for controlling an irradiation direction of light emitted from the projector, based on the projector position information and the flight vehicle position information.

9 Claims, 12 Drawing Sheets

(51) Int. Cl.
| | |
|---|---|
| *H05B 47/105* | (2020.01) |
| *B60L 8/00* | (2006.01) |
| *B64B 1/06* | (2006.01) |
| *B64B 1/50* | (2006.01) |
| *B64D 27/24* | (2006.01) |
| *B64D 47/02* | (2006.01) |
| *B64F 1/36* | (2017.01) |

(52) U.S. Cl.
CPC ............ *B64D 27/24* (2013.01); *B64D 47/02* (2013.01); *B64F 1/36* (2013.01); *G05D 1/106* (2019.05); *H05B 47/105* (2020.01); *B60L 2200/10* (2013.01); *B64D 2211/00* (2013.01)

(58) Field of Classification Search
CPC ........ B64B 1/06; B60L 8/003; B60L 2200/10; G05D 1/106; H05B 47/105
See application file for complete search history.

(56) References Cited

U.S. PATENT DOCUMENTS

| | | | | |
|---|---|---|---|---|
| 4,232,839 A | * | 11/1980 | Sicre .................. | G01S 1/02 244/186 |
| 5,285,685 A | * | 2/1994 | Chelette ................ | G06F 3/0362 340/407.1 |
| 5,487,172 A | * | 1/1996 | Hyatt .................. | B60R 16/0373 712/32 |
| 6,116,538 A | * | 9/2000 | Hafelfinger ............ | G09F 21/10 244/31 |
| 6,765,610 B1 | * | 7/2004 | Nakamura ........... | H04N 5/2351 348/222.1 |
| 6,879,344 B1 | * | 4/2005 | Nakamura ........... | H04N 5/3535 348/362 |
| 7,025,466 B2 | * | 4/2006 | Hoffmeister .......... | G03B 21/28 352/35 |
| 8,286,907 B2 | * | 10/2012 | Dohi .................... | B64C 31/036 244/13 |
| 9,573,605 B2 | * | 2/2017 | Steele .................... | A63G 21/22 |
| 9,869,766 B1 | * | 1/2018 | Breiholz ................ | G01S 7/003 |
| 9,969,494 B1 | * | 5/2018 | Buchmueller ....... | G05D 1/0058 |
| 2008/0207083 A1 | * | 8/2008 | Schnuckle ........... | A63H 33/22 446/220 |
| 2009/0012923 A1 | * | 1/2009 | Moses .................... | G06Q 10/10 706/46 |
| 2010/0282896 A1 | * | 11/2010 | Dohi .................... | B64C 31/036 244/13 |
| 2010/0305857 A1 | * | 12/2010 | Byrne ...................... | G06T 7/73 701/301 |
| 2013/0135118 A1 | * | 5/2013 | Ricci .................... | G08C 19/00 340/932.2 |
| 2014/0021291 A1 | * | 1/2014 | Vetter .................... | B64C 39/003 244/19 |
| 2014/0293432 A1 | * | 10/2014 | Takemoto ............ | G03B 21/142 359/630 |
| 2014/0320607 A1 | * | 10/2014 | Hamann ................ | G01W 1/12 348/47 |
| 2014/0339372 A1 | * | 11/2014 | Dekel .................... | B64C 39/024 244/7 R |
| 2015/0172611 A1 | * | 6/2015 | Nahmiyace ........... | H04N 9/3164 353/13 |
| 2015/0197335 A1 | * | 7/2015 | Dekel .................... | B64C 39/024 701/5 |
| 2015/0256123 A1 | | 9/2015 | Ahn | |
| 2015/0375850 A1 | * | 12/2015 | Salesse-Lavergne ........................ | B64C 27/57 244/17.13 |
| 2016/0188123 A1 | * | 6/2016 | Fujiune .................. | G06F 3/005 345/156 |
| 2016/0360594 A1 | * | 12/2016 | Chemel ................ | H05B 47/115 |
| 2017/0074666 A1 | * | 3/2017 | Kobayashi ............ | G06F 16/951 |
| 2017/0097260 A1 | * | 4/2017 | Nagashima ............... | G01J 1/44 |
| 2017/0131103 A1 | * | 5/2017 | Kurata .................. | G01C 21/206 |
| 2017/0183095 A1 | * | 6/2017 | Liu ........................ | B64C 39/024 |
| 2017/0235975 A1 | * | 8/2017 | Iwanami ................ | H04W 12/02 726/28 |
| 2017/0344017 A1 | * | 11/2017 | Liu ........................ | G05D 1/028 |
| 2018/0214241 A1 | * | 8/2018 | Furuta .................... | A61B 34/20 |
| 2018/0290729 A1 | * | 10/2018 | Shavit .................... | B64C 13/22 |
| 2018/0374270 A1 | * | 12/2018 | Kuriya ................ | A63F 13/5255 |
| 2019/0035314 A1 | * | 1/2019 | Wen ...................... | G09G 5/00 |
| 2019/0073001 A1 | * | 3/2019 | Kim ..................... | G02F 1/133308 |
| 2019/0130541 A1 | * | 5/2019 | Kudo ...................... | G06T 11/60 |
| 2019/0193856 A1 | * | 6/2019 | Prager .................... | B66C 1/425 |
| 2019/0261618 A1 | * | 8/2019 | Okumura ............... | B64C 39/024 |
| 2019/0383917 A1 | * | 12/2019 | Shinozuka ............ | G01S 7/4865 |
| 2020/0019189 A1 | * | 1/2020 | Chen ...................... | G08G 5/045 |
| 2020/0098185 A1 | * | 3/2020 | Schradin ................ | G09B 9/003 |
| 2020/0192391 A1 | * | 6/2020 | Vora .................... | G01C 21/3446 |
| 2020/0334164 A1 | * | 10/2020 | Suganuma .............. | G06F 13/38 |

FOREIGN PATENT DOCUMENTS

| | | | | | |
|---|---|---|---|---|---|
| CN | 203085121 U | * | 7/2013 | | |
| CN | 106445169 A | * | 2/2017 | .............. | B60Q 1/02 |
| CN | 207833563 U | * | 9/2018 | .............. | G01S 19/17 |
| CN | 109964148 A | * | 7/2019 | .............. | G01J 1/0411 |
| CN | 110392844 A | * | 10/2019 | .......... | G01S 7/4814 |
| DE | 19843902 A1 | * | 4/1999 | .............. | G06F 3/016 |
| DE | 19954790 A1 | * | 5/2001 | .............. | G09F 21/14 |
| EP | 0850789 A1 | * | 7/1998 | .............. | B60D 1/141 |
| GB | 2529442 A | * | 2/2016 | .............. | B60Q 1/02 |
| JP | 2000289695 A | | 10/2000 | | |
| JP | 2002021180 A | * | 1/2002 | .............. | G06F 3/016 |
| JP | 2002211496 A | | 7/2002 | | |
| JP | 2003104295 A | * | 4/2003 | .............. | G09F 21/14 |
| JP | 2003531543 A | | 10/2003 | | |
| JP | 2008211868 A | | 9/2008 | | |
| JP | 2008236595 A | * | 10/2008 | | |
| JP | 2016002973 A | | 1/2016 | | |
| JP | 2016505437 A | | 2/2016 | | |
| JP | 2017144988 A | | 8/2017 | | |
| JP | 2019015709 A | * | 1/2019 | .............. | G06T 19/00 |
| JP | 2020019419 A | * | 2/2020 | .......... | B64C 39/024 |
| KR | 20050065299 A | | 6/2005 | | |
| KR | 20190122721 A | * | 10/2019 | .......... | G01S 7/4814 |
| KR | 20200045176 A | * | 5/2020 | | |
| RU | 2657516 C2 | * | 6/2018 | .............. | G01S 17/89 |
| WO | 0180356 A3 | | 2/2002 | | |
| WO | WO-2017149526 A2 | * | 9/2017 | .............. | G01B 15/00 |
| WO | WO-2018091649 A1 | * | 5/2018 | .............. | G01S 17/89 |
| WO | WO-2018104584 A1 | * | 6/2018 | .............. | G01S 19/17 |
| WO | WO-2018167215 A1 | * | 9/2018 | .............. | G01S 17/46 |
| WO | WO-2019012817 A1 | * | 1/2019 | .............. | G06T 19/00 |
| WO | WO-2019123738 A1 | * | 6/2019 | .............. | G01S 7/4865 |
| WO | WO-2020027140 A1 | * | 2/2020 | .......... | B64D 27/24 |

OTHER PUBLICATIONS (ISA/237) Written Opinion of the International Search Authority for International Patent Application No. PCT/JP2019/029852, mailed by the Japan Patent Office dated Oct. 21, 2019.

* cited by examiner

SYSTEM, CONTROL DEVICE AND LIGHT AIRCRAFT

The contents of the following Japanese and PCT applications are incorporated herein by reference:
NO. 2018-145736 filed in JP on Aug. 2, 2018, and
NO. PCT/JP2019/029852 filed in WO on Jul. 30, 2019.

BACKGROUND

1. Technical Field

The present invention relates to a system, a control device and a light aircraft.

2. Related Art

Known is a flight vehicle that has a solar cell panel provided on an upper surface of a wing and flies by rotating a propeller by electric power from the solar cell panel (for example, refer to Patent Document 1).

CITATION LIST

Patent Document

Patent Document 1: Japanese Unexamined Patent Application Publication No. 2002-211496

Technical Problem

It is preferable to provide technology that can contribute to solving shortage in electric power of the flight vehicle at night, particularly.

DESCRIPTION OF EXEMPLARY EMBODIMENTS

Hereinafter, the present invention will be described through embodiments of the invention. However, the following embodiments do not limit the invention defined in the claims. Also, all combinations of features described in the embodiments are not necessarily essential to solutions of the invention.

Figure 1:
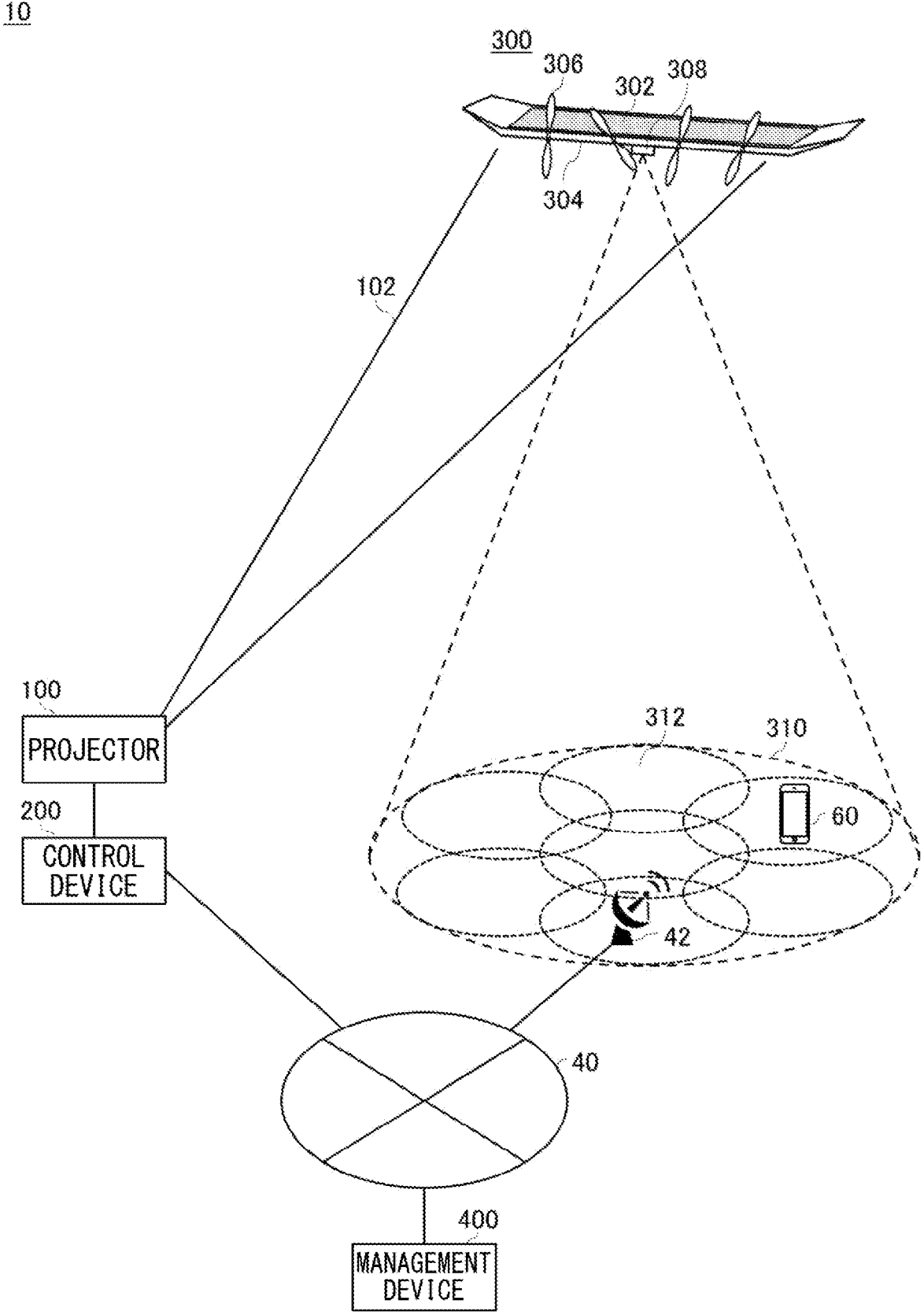
FIG. 1 shows schematically an example of a system 10.

FIG. 1 shows schematically an example of a system 10. The system 10 comprises a projector 100 and a control device 200.

The projector 100 is a device for irradiating light 102 in a specific direction. Examples of the light 102 that is irradiated by the projector 100 include laser light, visible light, ultraviolet light, infrared light and the like. The projector 100 is, for example, a search light. The projector 100 may also be a laser emission apparatus. The projector 100 may also be a flood light, a spotlight and the like. The projector 100 is equipped, for example, on the ground. The projector 100 may also be equipped on a rooftop of a building on the ground. The projector 100 may also be mounted on an aircraft. The projector 100 may be mounted on an aerodyne or may be mounted on a light aircraft. For example, the projector 100 is mounted on a balloon such as a captive balloon. The projector 100 may also be mounted on an airship. FIG. 1 shows an example where the projector 100 is equipped on the ground.

The control device 200 controls an irradiation direction of the light 102 emitted from the projector 100. In a case where the projector 100 has a function of changing the irradiation direction of the light 102, the control device 200 may control the irradiation direction of the light 102 emitted from the projector 100 by instructing the projector 100 on the irradiation direction of the light 102. In a case where the projector 100 does not have the function of changing the irradiation direction of the light 102, the control device 200 may control the irradiation direction of the light 102 emitted from the projector 100 by changing an angle of the projector 100 with a device for changing the angle of the entire projector 100, for example.

The control device 200 in accordance with the present embodiment controls the irradiation direction of the light 102 emitted from the projector 100, based on projector position information indicative of a position of the projector 100 and flight vehicle position information indicative of a position of a flight vehicle 300. The control device 200 may control the irradiation direction of the light 102 emitted from the projector 100 so as to irradiate the light 102 toward the flight vehicle 300.

The control device 200 may also receive, from the flight vehicle 300, a light-receiving amount received by the flight vehicle 300, and control the irradiation direction of the light 102 emitted from the projector 100, based on the light-receiving amount. The control device 200 may control the irradiation direction of the light 102 emitted from the projector 100, based on a relation between the irradiation direction of the light 102 emitted from the projector 100 and the light-receiving amount received by the flight vehicle 300. For example, the control device 200 controls the irradiation direction of the light 102 emitted from the projector 100 so that the light-receiving amount received by the flight vehicle 300 becomes the largest. In this way, by feeding back an intensity of light received by the flight vehicle 300 in the sky to the control device 200, the control device 200 may execute closed loop control so that a center of the light hits the flight vehicle 300.

The flight vehicle 300 includes a solar cell panel 302 mounted on an upper surface, a solar cell panel 304 mounted on a lower surface, propellers 306, an antenna 308, an electric power storage unit (not shown), and a control device (not shown). The electric power storage unit is, as it is called, a secondary battery, a storage battery, a battery or the like, and may also be any kind of a battery such as a lithium ion battery and a lithium air battery. The control device executes a variety of controls such as flight control.

The solar cell panel 302 receives sunlight to generate electric power. The electric power generated by the solar cell panel 302 is transmitted and stored in the electric power storage unit. The solar cell panel 304 receives light irradiated by the projector 100 to generate electric power. The electric power generated by the solar cell panel 304 is transmitted and stored in the electric power storage unit. Note that, the flight vehicle 300 may include a solar cell panel which can generate electric power at both surfaces, instead of including the solar cell panel 302 and the solar cell panel 304. The flight vehicle 300 may also include a rotatable solar cell panel so as to be able to receive both light from above and light from below.

The antenna 308 is used so as to form a communication area 310 on the ground. The antenna 308 may be a multi-beam antenna, for example, and the communication area 310 may be formed by a plurality of sub-cells 312. The flight vehicle 300 may cause the antenna 308 to form the communication area 310 by using the electric power stored in the electric power storage unit. The flight vehicle 300 may provide wireless communication service for a user terminal 60 in the communication area 310. The flight vehicle 300 flies in the stratosphere and provides the wireless communication service for the user terminal 60 on the ground, for example. The flight vehicle 300 may also function as a stratosphere platform.

The user terminal 60 may be any communication terminal as long as it can communicate with the flight vehicle 300. For example, the user terminal 60 is a mobile phone such as a smartphone. The user terminal 60 may also be a tablet terminal, a PC (Personal Computer) and the like.

The flight vehicle 300 provides the wireless communication service for the user terminal 60 by relaying communication between the user terminal 60 and a network 40 on the ground, for example. The network 40 may include a core network that is provided by a telecommunication carrier. The network 40 may also include the Internet.

The flight vehicle 300 may communicate with the network 40 via a gateway 42 in the communication area 310 of gateways 42 arranged in each region on the ground. For example, the flight vehicle 300 may also communicate with the network 40 via a communication satellite (not shown). The flight vehicle 300 transmits data received from the user terminal 60 in the communication area 310 to the network 40, for example. For example, when the flight vehicle 300 receives data addressed to the user terminal 60 in the communication area 310 via the network 40, the flight vehicle 300 also transmits the data to the user terminal 60.

The flight vehicle 300 may be controlled by a management device 400 that is equipped on the ground and manages the flight vehicle 300. The flight vehicle 300 flies according to an instruction transmitted by the management device 400 via the network 40 and the gateway 42, for example. The management device 400 controls the flight vehicle 300 by transmitting an instruction. The management device 400 controls the flight vehicle 300 by instructing the flight vehicle 300 on a flying pattern, a flying speed, a dimension of the communication area 310 and a shape of the communication area 310. The flight vehicle 300 may transmit light-receiving amount information indicative of a light-receiving amount to the management device 400 and the control device 200 via the gateway 42 and the network 40.

The control device 200 receives the flight vehicle position information of the flight vehicle 300 from the management device 400, for example. The management device 400 may monitor the position of the flight vehicle 300. The management device 400 monitors the position of the flight vehicle 300 by periodically receiving position information from the flight vehicle 300, for example. The flight vehicle 300 specifies the position of the flight vehicle 300 by a positioning function of a GPS (Global Positioning System) or the like, for example, and transmits the specified position to the management device 400. The control device 200 may also receive the flight vehicle position information from the flight vehicle 300 via the gateway 42 and the network 40, without the management device 400. The control device 200 can control the irradiation direction of the light 102 emitted from the projector 100 so as to irradiate the flight vehicle 300 with the light 102, thereby supplying electric power to the flight vehicle 300 in flight.

Figure 2:
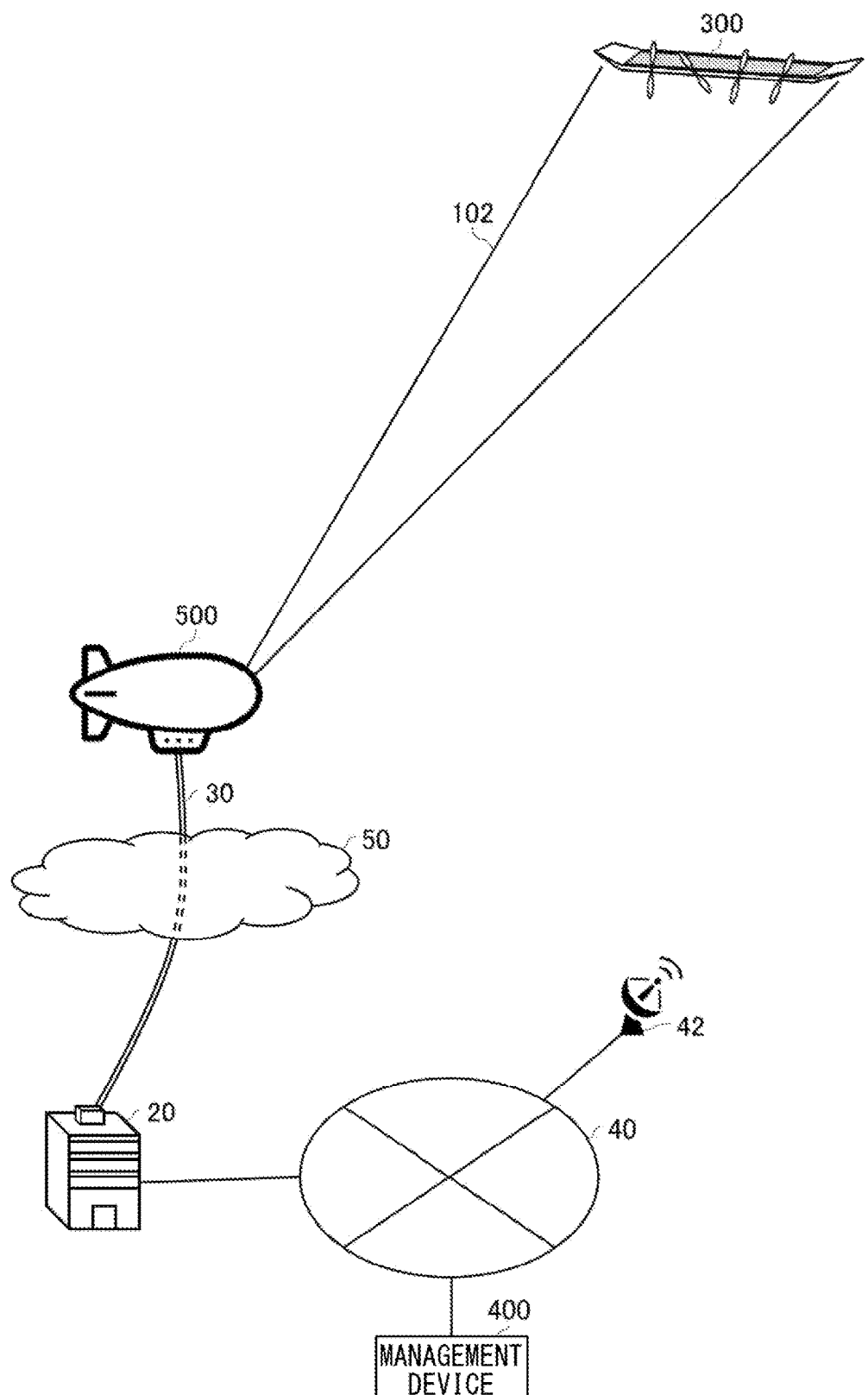
FIG. 2 shows schematically an example of the system 10.

FIG. 2 shows schematically an example of the system 10. The system 10 shown in FIG. 2 comprises a captive balloon 500 on which the projector 100 is mounted, and the flight vehicle 300. In the system 10 shown in FIG. 2, the control device 200 is mounted on the captive balloon 500, for example. Note that, the control device 200 may also be mounted on an electric power transmission apparatus 20. The captive balloon 500 may be an example of the light aircraft.

The captive balloon 500 is supplied with electric power from the electric power transmission apparatus 20 via a cable 30. The electric power transmission apparatus 20 supplies electric power to the captive balloon 500 via the cable 30 by high-voltage direct current transmission, for example. The cable 30 may include a lightweight cable for high-voltage direct current. The captive balloon 500 may cause the projector 100 to irradiate the light 102 by using the electric power received from the electric power transmission apparatus 20 via the cable 30.

The captive balloon 500 floats in the air at any height. The captive balloon 500 may be anchored to the electric power transmission apparatus 20 by the cable 30. The captive balloon 500 may be also anchored to the electric power transmission apparatus 20 by a rope (not shown).

The captive balloon 500 may stay above a lower cloud 50 that affects wireless electric power transmission. Examples of the lower cloud 50 include a stratocumulus, a stratus, a cumulus, a cumulonimbus and the like. For example, the captive balloon 500 stays in the air at the altitude of 5 to 7 km.

The control device 200 causes the projector 100 of the captive balloon 500 to irradiate the light 102 toward the flight vehicle 300, based on the projector position information of the projector 100 and the flight vehicle position information of the flight vehicle 300.

In a case where the control device 200 is mounted on the captive balloon 500, the control device 200 may receive the projector position information of the projector 100 from the projector 100. The projector 100 has a positioning function of a GPS and the like, and transmits position information measured by the positioning function to the control device 200, for example. The projector position information may include latitude, longitude and altitude. The control device 200 may also acquire position information of the captive balloon 500, as the projector position information of the projector 100. The captive balloon 500 has a positioning function of a GPS and the like, and transmits position information measured by the positioning function to the control device 200, for example. The control device 200 may also acquire position information thereof, as the projector position information of the projector 100. The control device 200 has a positioning function of a GPS and the like, and specifies a position thereof by the positioning function, for example.

In a case where the control device 200 is mounted on the captive balloon 500, the control device 200 may also receive the flight vehicle position information of the flight vehicle 300 from the electric power transmission apparatus 20. For example, the cable 30 includes a communication cable, and the control device 200 receives the flight vehicle position information of the flight vehicle 300 from the electric power transmission apparatus 20 via the cable 30. The electric power transmission apparatus 20 may receive the flight vehicle position information of the flight vehicle 300 from the management device 400. The electric power transmission apparatus 20 may also receive the flight vehicle position information from the flight vehicle 300 via the gateway 42 and the network 40.

In a case where the control device 200 is mounted on the electric power transmission apparatus 20, the control device 200 may receive the projector position information of the projector 100 from the projector 100 via the cable 30. The control device 200 may also receive the position information of the captive balloon 500 from the captive balloon 500 via the cable 30, as the projector position information of the projector 100.

In a case where the control device 200 is mounted on the electric power transmission apparatus 20, the control device 200 may also receive the flight vehicle position information of the flight vehicle 300 from the management device 400 via the network 40. The control device 200 may also receive the flight vehicle position information from the flight vehicle 300 via the gateway 42 and the network 40, without the management device 400.

As described above, the flight vehicle 300 can function as a stratosphere platform. The stratosphere platform that relies on sunlight for electric power supply may have a problem of shortage in electric power at night. Long-distance wireless electric power supply to the stratosphere platform that is flying at high altitudes is one of effective solutions. However, the long-distance wireless electric power supply has problems such as radio wave regulation, influence on a communication satellite, and attenuation of electric power due to clouds and raindrops. In contrast, according to the system 10 of the present embodiment, since the electric power is supplied by the light 102, it is not necessary to regulate the radio wave and it is possible to wirelessly supply electric power to the flight vehicle 300 without affecting a communication satellite. According to the system 10 of the present embodiment, since the light 102 is irradiated to the flight vehicle 300 from the captive balloon 500 staying above the lower cloud 50, it is also possible to reduce the attenuation of electric power due to clouds and raindrops.

The electric power transmission apparatus 20 may be an apparatus in the core network that is provided by a telecommunication carrier. For example, the electric power transmission apparatus 20 may be a part of a gateway apparatus. The electric power transmission apparatus 20 may also be integrated with the management device 400.

Figure 3:
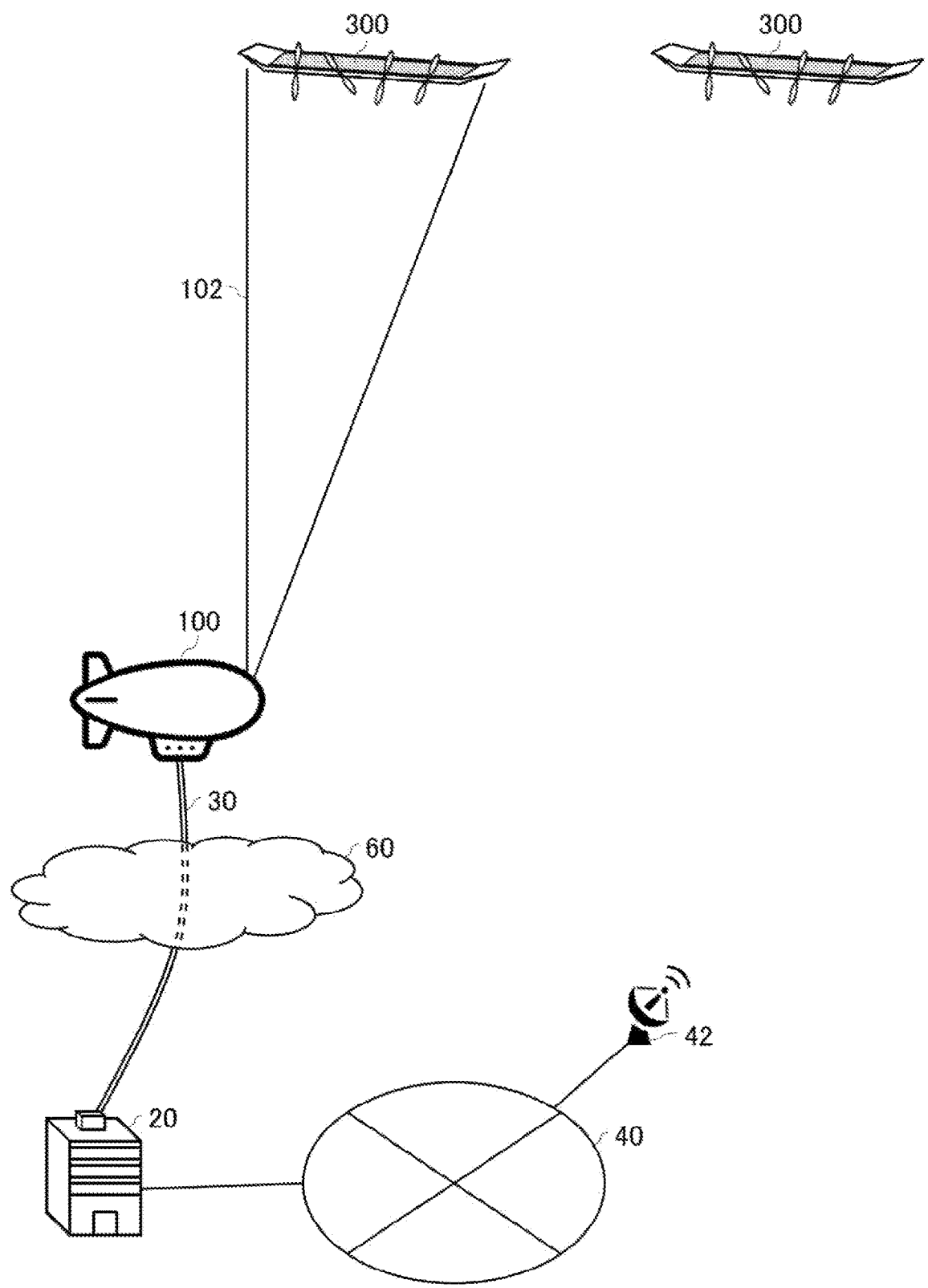
FIG. 3 shows schematically an example of the system 10.

FIG. 3 shows schematically an example of the system 10. The system 10 shown in FIG. 3 comprises a plurality of flight vehicles 300. The control device 200 may specify one flight vehicle 300 of the plurality of flight vehicles 300 and cause the projector 100 of the captive balloon 500 to irradiate the light 102 toward the one flight vehicle 300.

The control device 200 acquires a priority of each of the plurality of flight vehicles 300, and specifies one flight vehicle 300 having the highest priority, for example. As a specific example, the control device 200 specifies a flight vehicle 300, which has the smallest amount of electric power stored in the electric power storage unit, of the plurality of flight vehicles 300.

Then, the control device 200 acquires flight vehicle position information of the specified one flight vehicle 300, and controls the irradiation direction of the light 102 emitted from the projector 100 of the captive balloon 500 so as to irradiate the one flight vehicle 300 with the light 102, based on the projector position information of the projector 100 and the flight vehicle position information.

When a remaining amount of electric power in the electric power storage unit of the flight vehicle 300 having the highest priority of the plurality of flight vehicles 300 becomes larger than a predetermined threshold value, the control device 200 may control the irradiation direction of the light 102 emitted from the projector 100 of the captive balloon 500 so as to irradiate a flight vehicle 300 having a second highest priority of the plurality of flight vehicles 300 with the light 102.

Figure 4:
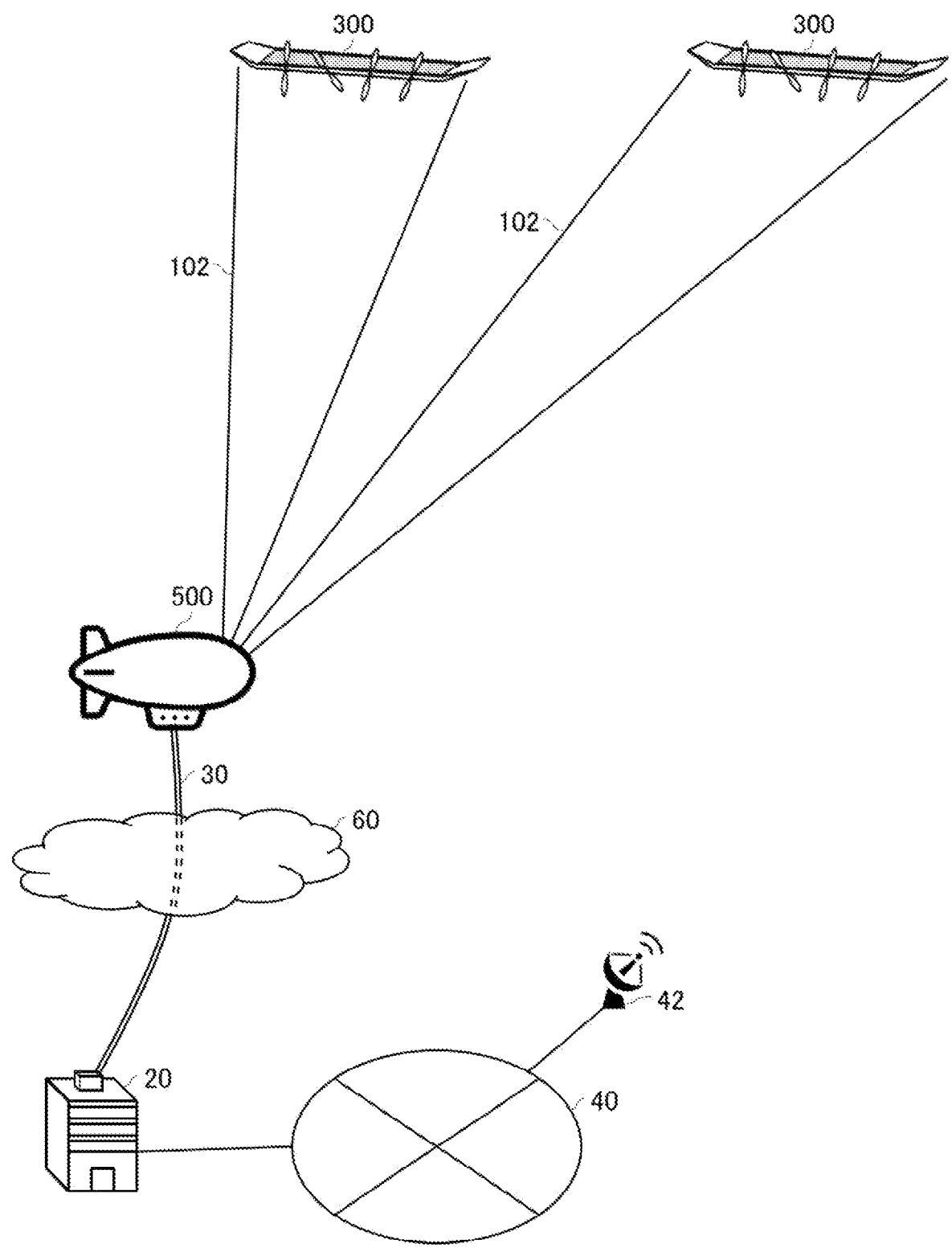
FIG. 4 shows schematically an example of the system 10.

FIG. 4 shows schematically an example of the system 10. The system 10 shown in FIG. 4 comprises a plurality of flight vehicles 300. The captive balloon 500 shown in FIG. 4 also includes a plurality of projectors 100.

The control device 200 acquires projector position information of the plurality of projectors 100 and flight vehicle position information of the plurality of flight vehicles 300. The control device 200 controls the irradiation direction of the light 102 emitted from each of the plurality of projectors 100, based on the projector position information of the plurality of projectors 100 and the flight vehicle position information of the plurality of flight vehicles 300. The control device 200 may control the irradiation direction of the light 102 emitted from each of the plurality of projectors 100 so that each of the plurality of projectors 100 irradiates each of the plurality of flight vehicles 300 with the light 102.

Figure 5:
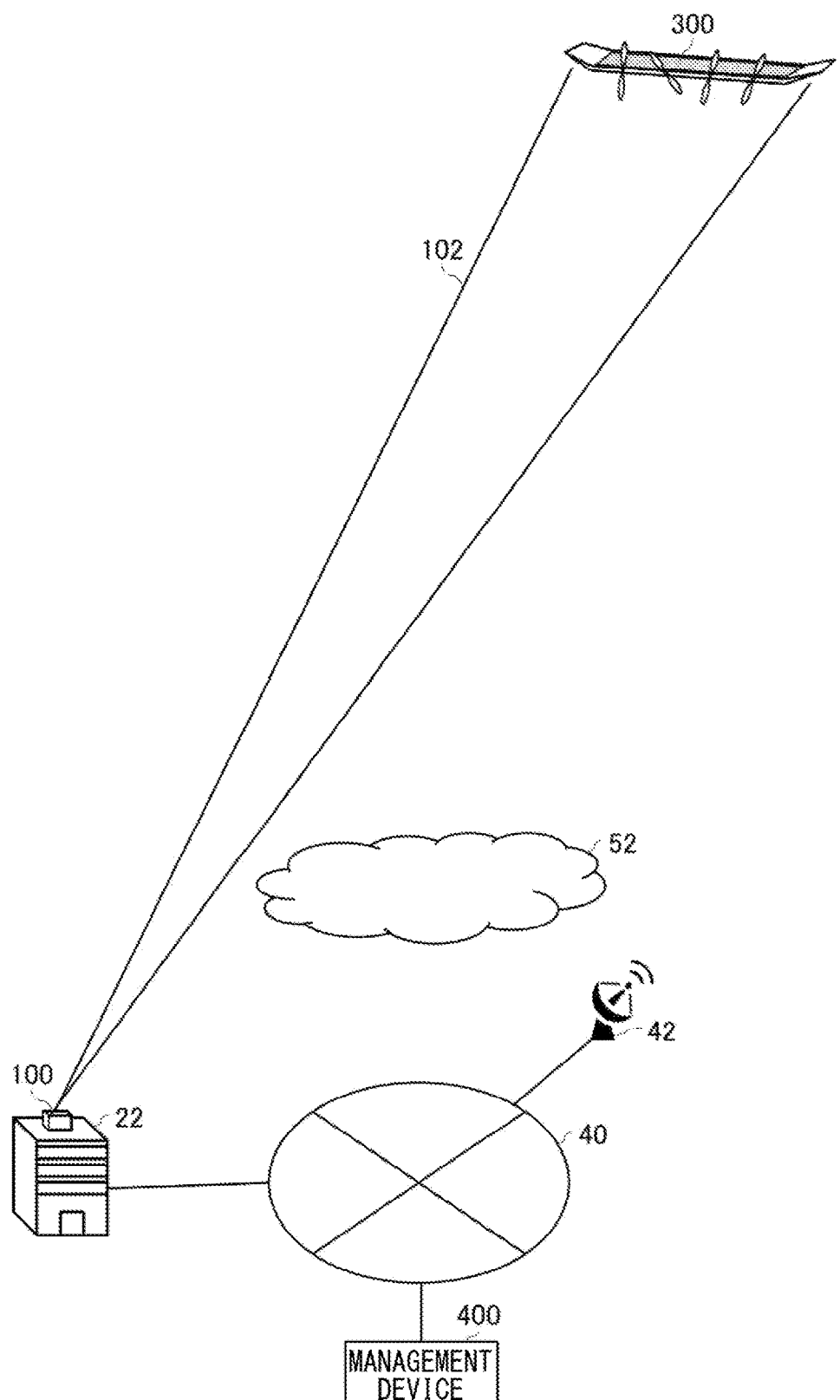
FIG. 5 shows schematically an example of the system 10.

FIG. 5 shows schematically an example of the system 10. The system 10 shown in FIG. 5 comprises the projector 100 equipped on the ground, and the flight vehicle 300. FIG. 5 exemplifies a case where the projector 100 is equipped on a rooftop of a building 22 on the ground. However, the equipment place of the projector 100 is not limited thereto, and may be any place on the ground. The building 22 may be any building. The building 22 may also be the electric power transmission apparatus 20. In the system 10 shown in FIG. 5, the control device 200 may be equipped in the building 22.

The control device 200 causes the projector 100 to irradiate the light 102 toward the flight vehicle 300, based on the projector position information of the projector 100 and the flight vehicle position information of the flight vehicle 300. The control device 200 may receive the projector position information of the projector 100 from the projector 100. The control device 200 may also acquire position information of the building 22, as the projector position information of the projector 100.

The control device 200 also controls the irradiation direction of the light 102 emitted from the projector 100, based on a relation between the irradiation direction of the light 102 emitted from the projector 100 and the light-receiving amount received by the flight vehicle 300. The control device 200 may receive light-receiving amount information indicative of the light-receiving amount received by the flight vehicle 300 from the flight vehicle 300 via the network 40. The control device 200 may also receive light-receiving amount information indicative of the light-receiving amount received by the flight vehicle 300 from the management device 400 via the network 40. Note that, the control device 200 may also use, as the light-receiving amount information indicative of the light-receiving amount, information indicative of an electric power-receiving amount received by the received light.

Figure 6:
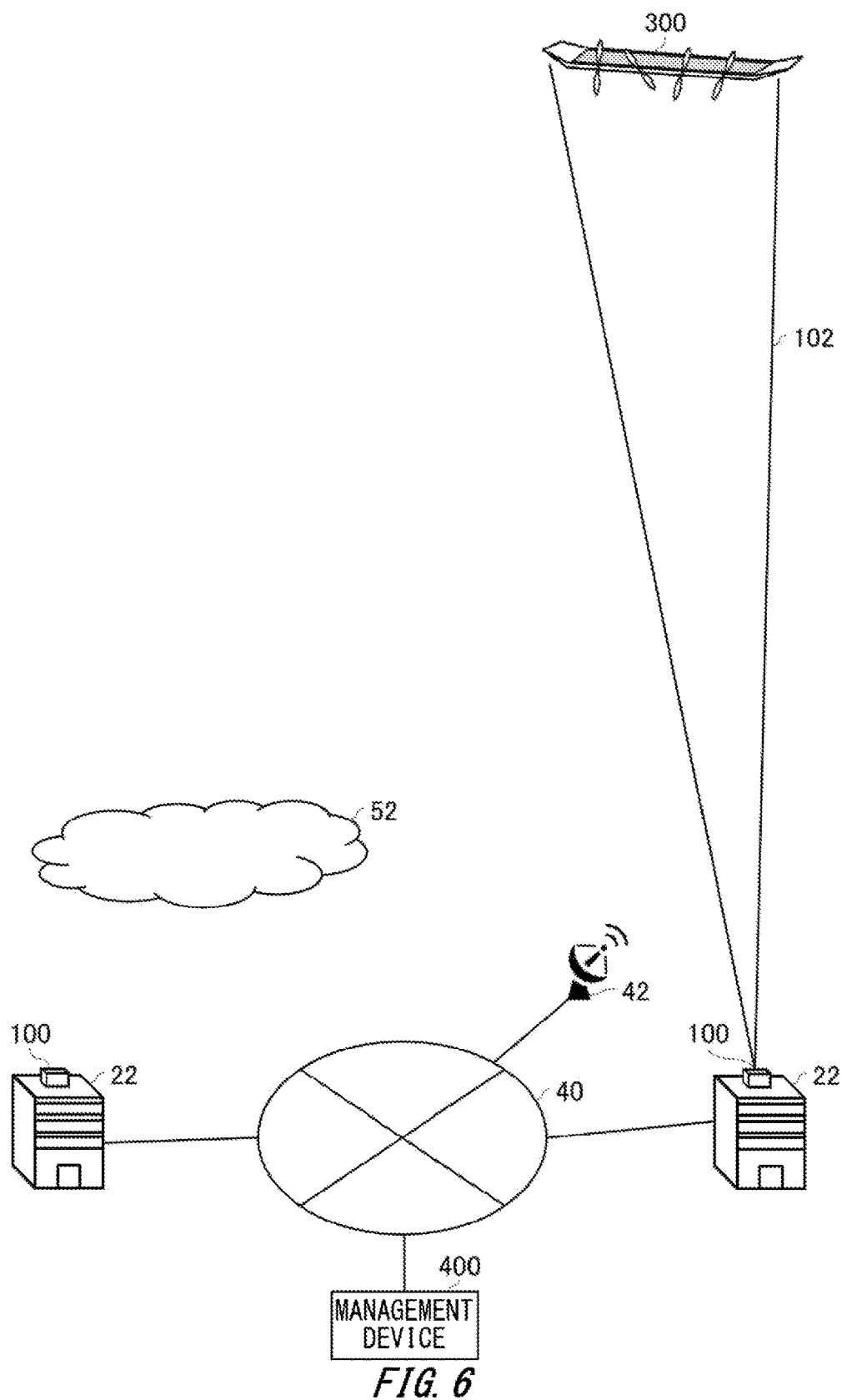
FIG. 6 shows schematically an example of the system 10.

FIG. 6 shows schematically an example of the system 10. The system 10 shown in FIG. 6 comprises a plurality of projectors 100. In the example shown in FIG. 6, each of the plurality of projectors 100 is equipped on each of a plurality of buildings 22. FIG. 6 shows two projectors 100. However, the number of the projectors 100 is not limited thereto and may be three or more. In the system 10 shown in FIG. 6, the control device 200 may be equipped in any one of the plurality of buildings 22 and may also be equipped at any one place on the network 40.

In the example shown in FIG. 6, the control device 200 selects any one of the plurality of projectors 100, based on projector position information of each of the plurality of projectors 100, flight vehicle position information of the flight vehicle 300, and a position of cloud 52. For example, the control device 200 selects a projector 100 from the plurality of projectors 100, based on the position of the cloud 52 between each of the plurality of projectors 100 and the flight vehicle 300. As a specific example, in a case where the cloud 52 exists between one projector 100 of the two projectors 100 and the flight vehicle 300 and the cloud 52 does not exist between the other projector 100 and the flight vehicle 300, the control device 200 selects the other projector 100.

Then, the control device 200 controls the irradiation direction of the light 102 emitted from the selected projector 100 so as to irradiate the light 102 toward the flight vehicle 300. Thereby, it is possible to select the projector 100 whose light 102 is not blocked by the cloud 52 from the plurality of projectors 100 and to irradiate the flight vehicle 300 with the light 102.

Figure 7:
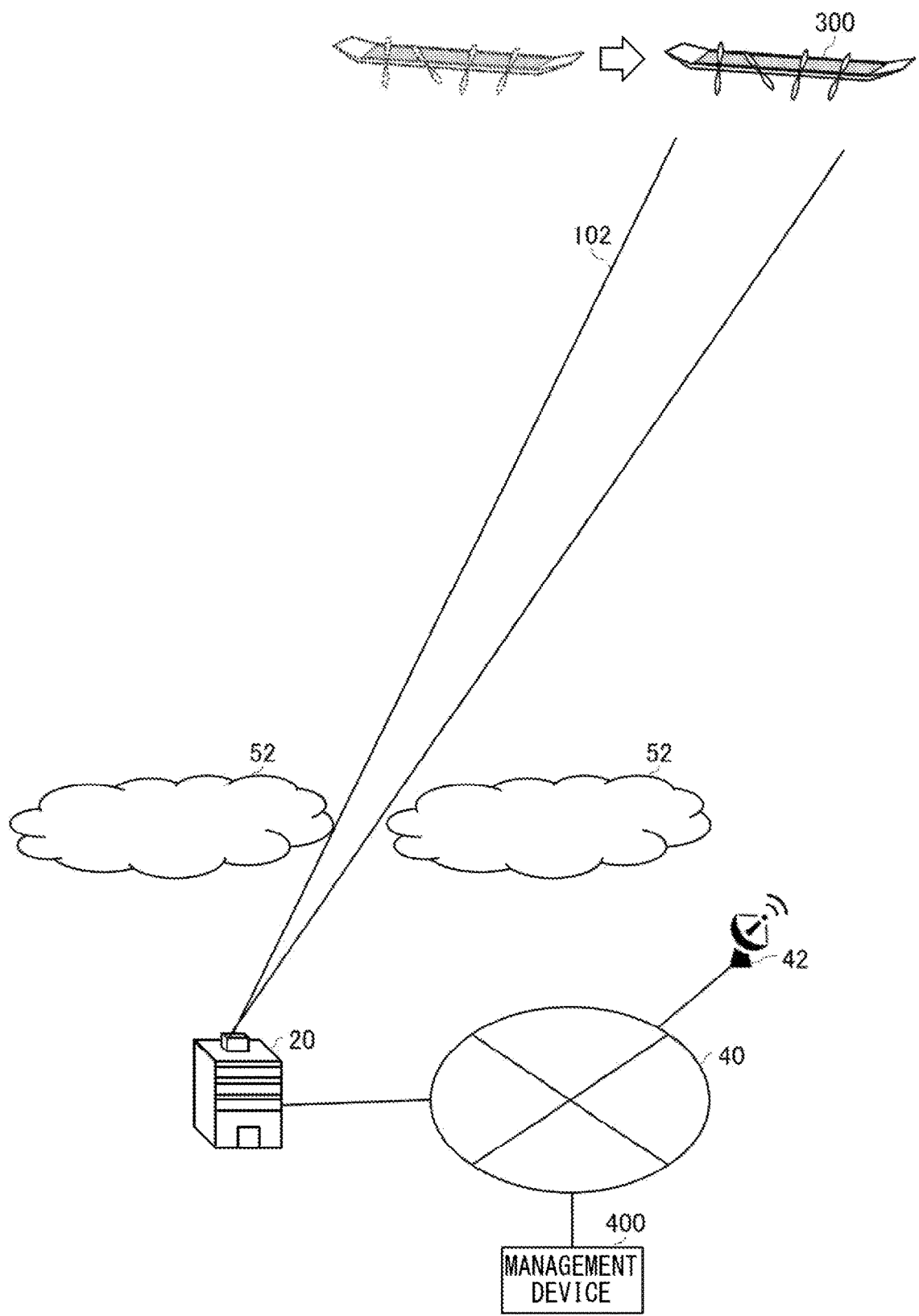
FIG. 7 shows schematically an example of the system 10.

FIG. 7 shows schematically an example of the system 10. Herein, differences from the system 10 shown in FIG. 5 are mainly described. In the system 10 shown in FIG. 7, a control device mounted on the flight vehicle 300 acquires the positions of the clouds 52 between the projector 100 that is equipped on the ground and irradiates the flight vehicle 300 with light and the flight vehicle 300, and causes the flight vehicle 300 to fly to a position at which the light irradiated by the projector 100 can be received without being blocked by the clouds 52, based on the positions of the clouds 52.

The control device mounted on the flight vehicle 300 may store therein the projector position information indicative of the position of the projector 100. The projector position information may be stored in advance, and the control device may receive the projector position information from the projector 100 or the management device 400 via the network 40 and the gateway 42.

The control device mounted on the flight vehicle 300 acquires the positions of the clouds 52 between the projector 100 and the flight vehicle 300 by using a satellite photograph, for example. The control device may receive a satellite photograph captured by a communication satellite from the communication satellite. The control device may also receive the satellite photograph from an apparatus equipped on the ground, via the network 40 and the gateway 42. For example, the control device receives the satellite photograph from an apparatus for collecting and managing satellite photographs, via the network 40 and the gateway 42. The control device may specify a position at which light irradiated by the projector 100 can be received without being blocked by the clouds 52, from the position of the flight vehicle 300, the position of the projector 100, and the positions of the clouds 52 perceived from the satellite photograph.

In a case where the flight vehicle 300 includes an imaging unit capable of capturing an area below the flight vehicle, the control device may also acquire the positions of the clouds 52 between the projector 100 and the flight vehicle 300 by using an image captured by the imaging unit. The control device may specify a position at which light irradiated by the projector 100 can be received without being blocked by the clouds 52, from the position of the flight vehicle 300, the position of the projector 100, and the positions of the clouds 52 perceived from the captured image.

Figure 8:
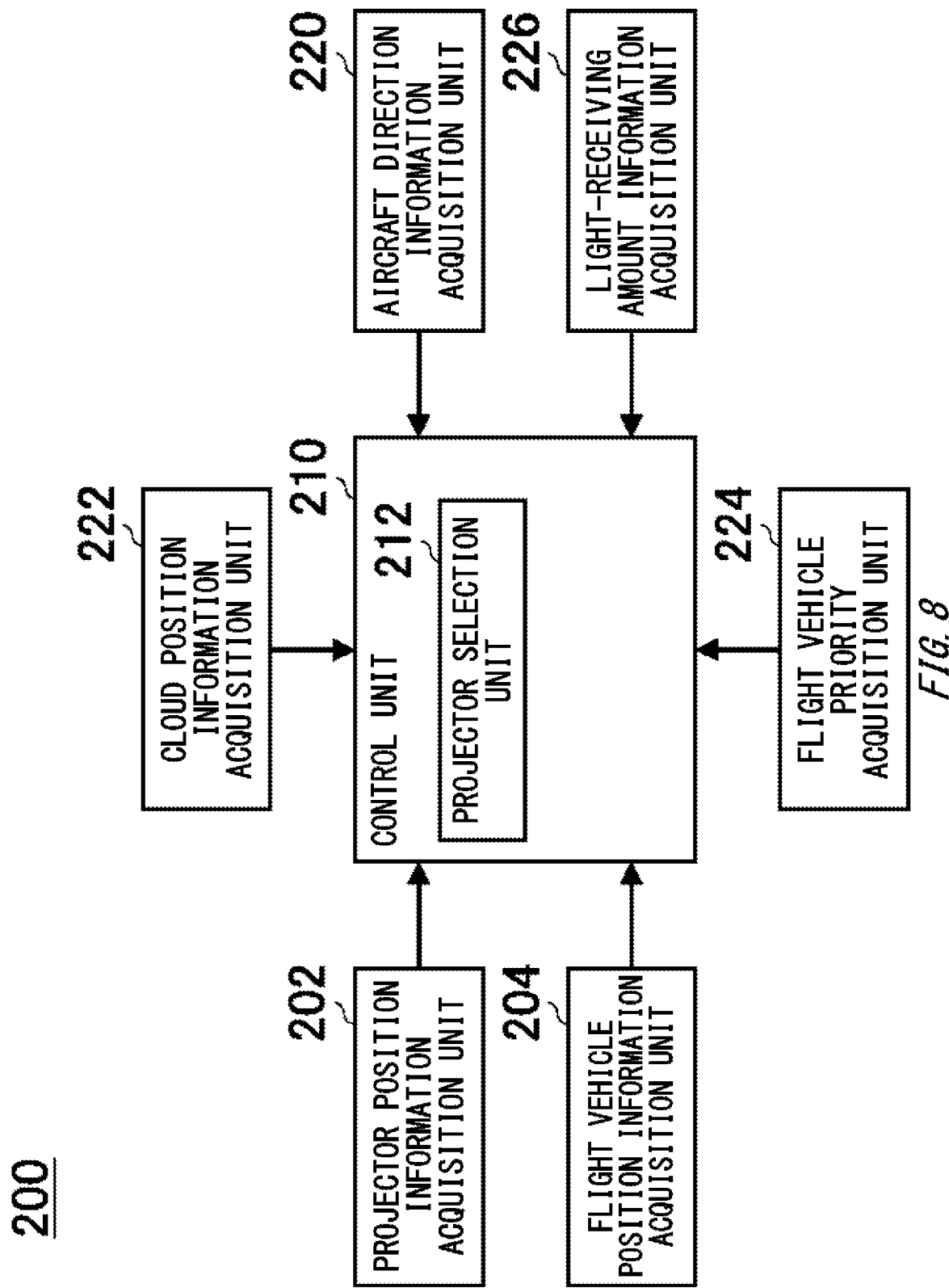
FIG. 8 shows schematically an example of a functional configuration of a control device 200 mounted in an electric power transmission apparatus 20.

FIG. 8 shows schematically an example of a functional configuration of the control device 200 mounted in the electric power transmission apparatus 20. The control device 200 comprises a projector position information acquisition unit 202, a flight vehicle position information acquisition unit 204, a control unit 210, an aircraft direction information acquisition unit 220, a cloud position information acquisition unit 222, a flight vehicle priority acquisition unit 224, and a light-receiving amount information acquisition unit 226.

The projector position information acquisition unit 202 acquires the projector position information of the projector 100. The projector position information acquisition unit 202 may receive the projector position information form the projector 100 via the cable 30. The projector position information acquisition unit 202 may also receive, as the projector position information of the projector 100, the position information of the captive balloon 500 from the captive balloon 500 via the cable 30.

The flight vehicle position information acquisition unit 204 acquires the flight vehicle position information of the flight vehicle 300. The flight vehicle position information acquisition unit 204 may receive the flight vehicle position information of the flight vehicle 300 from the management device 400. The flight vehicle position information acquisition unit 204 may also receive the flight vehicle position information from the flight vehicle 300 via the gateway 42 and the network 40, without via the management device 400. The flight vehicle position information acquisition unit 204 may also acquire flying direction information indicative of a flying direction of the flight vehicle 300, in addition to the flight vehicle position information of the flight vehicle 300.

The control unit 210 controls the irradiation direction of the light 102 emitted from the projector 100, based on the projector position information acquired by the projector position information acquisition unit 202 and the flight vehicle position information acquired by the flight vehicle position information acquisition unit 204. The control unit 210 may also control the irradiation direction of the light 102 emitted from the projector 100 so as to irradiate the light 102 toward the flight vehicle 300. The flight vehicle position information acquisition unit 204 may continuously acquire the flight vehicle position information, and the control unit 210 may control the irradiation direction of the light 102 emitted from the projector 100 so as to continuously irradiate the light 102 toward the flight vehicle 300 under moving by using the flight vehicle position information that is continuously acquired by the flight vehicle position information acquisition unit 204. The control unit 210 may acquire the flying direction information of the flight vehicle 300 from the flight vehicle position information acquisition unit 204, and control the irradiation direction of the light 102 emitted from the projector 100 in conformity to the flying direction of the flight vehicle 300. In this way, the control unit 210 may cause the light 102 emitted from the projector 100 to automatically follow the flight vehicle 300. The control unit 210 may instruct the projector 100 or the captive balloon 500 on the irradiation direction of the light 102, via the cable 30. The control unit 210 may be an example of the irradiation direction control unit.

In a case where the captive balloon 500 has a function of adjusting a direction, the control unit 210 may control a direction of the captive balloon 500 and the irradiation direction of light emitted from the projector 100, based on the projector position information and the flight vehicle position information. For example, when it is not possible to irradiate the flight vehicle 300 with the light 102 simply by controlling the irradiation direction of light emitted from the projector 100, the control unit 210 changes a direction of the captive balloon 500. The control unit 210 issues a direction changing instruction to the captive balloon 500, thereby changing a direction of the captive balloon 500, for example.

The aircraft direction information acquisition unit 220 acquires aircraft direction information indicative of a direction of the captive balloon 500. The aircraft direction information acquisition unit 220 may receive the aircraft direction information from the captive balloon 500, via the cable 30. The control unit 210 may control the irradiation direction of light emitted from the projector 100, based on the projector position information, the flight vehicle position information and the aircraft direction information.

The cloud position information acquisition unit 222 acquires cloud position information indicative of a position of cloud between the projector 100 and the flight vehicle 300. The cloud position information acquisition unit 222 receives the cloud position information indicative of a position of the cloud between the projector 100 and the flight vehicle 300 from a weather information server that provides information about positions of clouds in each area, via the network 40, for example.

In a case where the flight vehicle 300 has a function of detecting a position of cloud between the flight vehicle and the projector 100, the cloud position information acquisition unit 222 may receive the cloud position information from the flight vehicle 300. The cloud position information acquisition unit 222 receives the cloud position information from the flight vehicle 300, via the gateway 42 and the network 40, for example.

In a case where the captive balloon 500 has a function of detecting a position of cloud between the captive balloon and the flight vehicle 300, the cloud position information acquisition unit 222 may receive the cloud position information from the captive balloon 500. The cloud position information acquisition unit 222 receives the cloud position information from the captive balloon 500, via the cable 30, for example.

The control unit 210 may move the captive balloon 500, based on the cloud position information acquired by the cloud position information acquisition unit 222. In a case where a cloud exists between the projector 100 and the flight vehicle 300 and the light 102 emitted from the projector 100 is blocked by the cloud, for example, the control unit 210 moves the captive balloon 500 to a position at which the light 102 emitted from the projector 100 is not blocked by the cloud. The control unit 210 may move the captive balloon 500 by transmitting a moving instruction to the captive balloon 500 via the cable 30, for example. The control unit 210 may be an example of the aircraft moving control unit.

The control unit 210 may move the flight vehicle 300, based on the cloud position information acquired by the cloud position information acquisition unit 222. In a case where a cloud exists between the projector 100 and the flight vehicle 300 and the light 102 emitted from the projector 100 is blocked by the cloud, for example, the control unit 210 moves the flight vehicle 300 to a position at which the light 102 emitted from the projector 100 is not blocked by the cloud. The control unit 210 may move the flight vehicle 300 by transmitting a moving instruction to the flight vehicle 300 via the network 40 and the gateway 42, for example. The control unit 210 may be an example of the flight vehicle moving control unit.

The flight vehicle priority acquisition unit 224 acquires the priority of each of the plurality of flight vehicles 300. The priority is determined, based on a remaining amount of electric power stored in the electric power storage unit mounted on each of the plurality of flight vehicles 300, for example. As a specific example, the smaller the remaining amount of electric power is, the higher priority is allotted. The control unit 210 may control the irradiation direction of the light 102 emitted from the projector 100, based on the priorities of the plurality of flight vehicles 300 acquired by the flight vehicle priority acquisition unit 224.

The light-receiving amount information acquisition unit 226 acquires light-receiving amount information indicative of the light-receiving amount received by the flight vehicle 300. The light-receiving amount information acquisition unit 226 may receive the light-receiving amount information indicative of the light-receiving amount received by the flight vehicle 300 from the flight vehicle 300, via the network 40. The light-receiving amount information acquisition unit 226 may also receive the light-receiving amount information indicative of the light-receiving amount received by the flight vehicle 300 from the management device 400, via the network 40. The control unit 210 may control the irradiation direction of the light 102 emitted from the projector 100, based on a relation between the irradiation direction of the light 102 emitted from the projector 100 and the light-receiving amount received by the flight vehicle 300. For example, the control unit 210 changes appropriately the irradiation direction of the light 102 emitted from the projector 100, specifies a relation with the light-receiving amount received by the flight vehicle 300 every change to specify an irradiation direction in which the light-receiving amount received by the flight vehicle 300 is the largest, and sets the irradiation direction of the light 102 emitted from the projector 100 to the specified irradiation direction.

The control unit 210 includes a projector selection unit 212. In a case where the system 10 comprises the plurality of projectors 100, the projector selection unit 212 selects a projector 100 from the plurality of projectors 100, based on the position of the cloud between each of the plurality of projectors 100 and the flight vehicle 300. The projector selection unit 212 may also perceive the position of the cloud between each of the plurality of projectors 100 and the flight vehicle 300 by the cloud position information received from the cloud position information acquisition unit 222.

For example, the projector selection unit 212 selects a projector 100 that the cloud 52 does not exist between the flight vehicle 300 and the projector 100 from the plurality of projectors 100. In a case where there is a plurality of projectors 100 that the cloud 52 does not exist between the flight vehicle 300 and each of the projectors 100, the projector selection unit 212 may select any projector 100 from the plurality of projectors 100.

The control unit 210 may control the irradiation direction of light emitted from the projector 100 selected by the projector selection unit 212, based on the projector position information of the projector 100 selected by the projector selection unit 212 and the flight vehicle position information. Note that, the control unit 210 may not include the projector selection unit 212.

Figure 9:
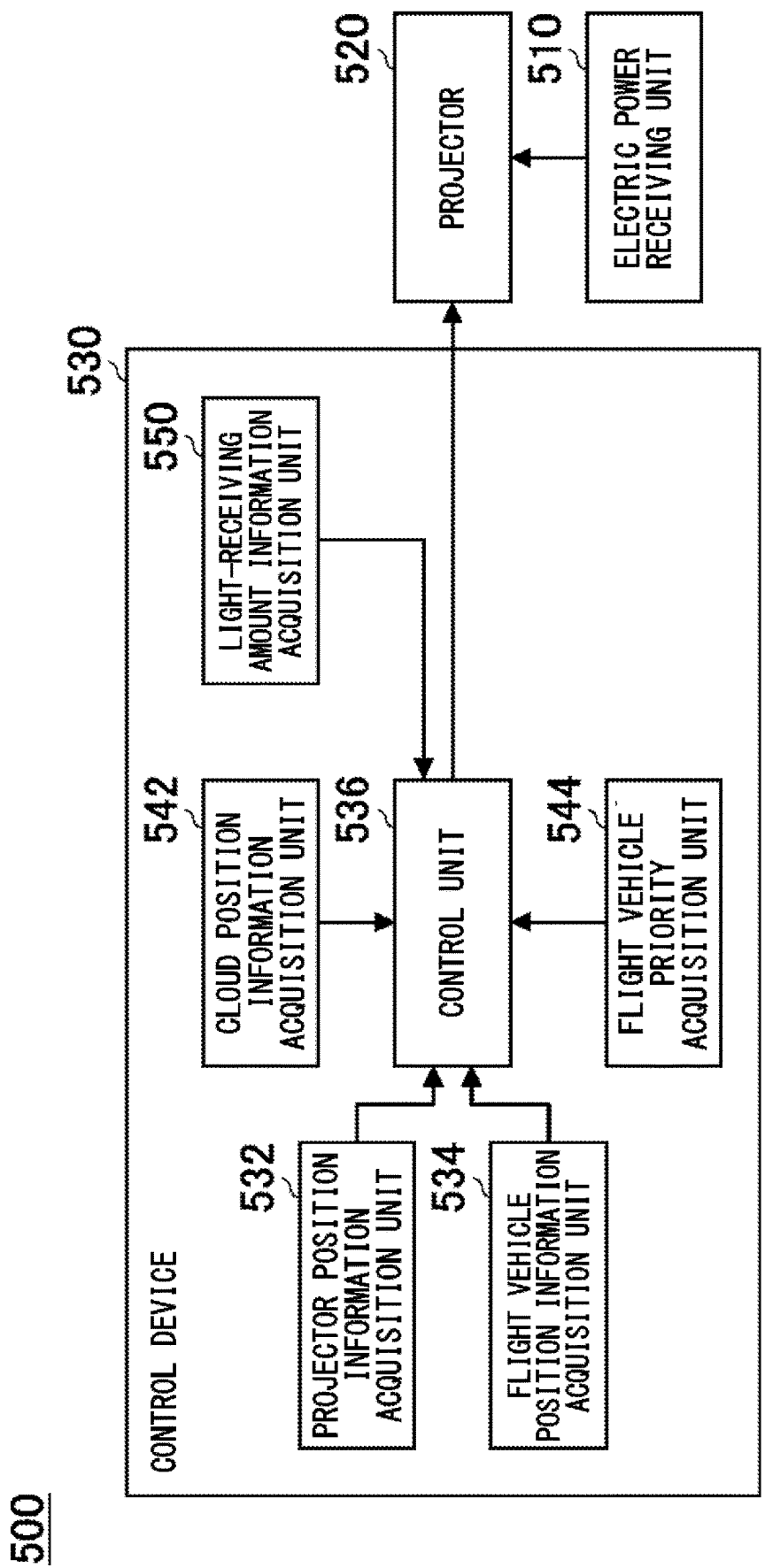
FIG. 9 shows schematically an example of a functional configuration of a captive balloon 500 on which a control device 530 is mounted.

FIG. 9 shows schematically an example of a functional configuration of the captive balloon 500 on which a control device 530 is mounted. The captive balloon 500 includes an electric power receiving unit 510, a projector 520, and a control device 530.

The electric power receiving unit 510 receives electric power transmitted via the cable 30 by the electric power transmission apparatus 20. The projector 520 irradiates the light 102 in a designated irradiation direction by using the electric power received by the electric power receiving unit 510. The electric power receiving unit 510 may include an electric power storage unit for storing the received electric power.

The control device 530 includes a projector position information acquisition unit 532, a flight vehicle position information acquisition unit 534, a control unit 536, a cloud position information acquisition unit 542, a flight vehicle priority acquisition unit 544, and a light-receiving amount information acquisition unit 550. Herein, differences from the control device 200 shown in FIG. 8 are mainly described.

The projector position information acquisition unit 532 acquires projector position information of the projector 520. In a case where the projector 520 has a positioning function, the projector position information acquisition unit 532 may receive the projector position information from the projector 520. In a case where the captive balloon 500 has a positioning function, the projector position information acquisition unit 532 may acquire position information specified by the positioning function, as the projector position information of the projector 520. Note that, the control device 530 may have a positioning function, and may acquire position information of the control device 530, as the position information of the projector 520.

The flight vehicle position information acquisition unit 534 acquires the flight vehicle position information of the flight vehicle 300. The flight vehicle position information acquisition unit 534 may receive the flight vehicle position information of the flight vehicle 300 from the electric power transmission apparatus 20 via the cable 30. The flight vehicle position information acquisition unit 534 may acquire the flying direction information of the flight vehicle 300, in addition to the flight vehicle position information.

The control unit 536 controls the irradiation direction of the light 102 emitted from the projector 520, based on the projector position information acquired by the projector position information acquisition unit 532 and the flight vehicle position information acquired by the flight vehicle position information acquisition unit 534. The control unit 536 may also control the irradiation direction of the light 102 emitted from the projector 520 so as to irradiate the light 102 toward the flight vehicle 300. The control unit 536 may control the irradiation direction of the light 102 emitted from the projector 520 so as to continuously irradiate the light 102 toward the flight vehicle 300 under moving by using the flight vehicle position information that is continuously acquired by the flight vehicle position information acquisition unit 534. The control unit 536 may acquire the flying direction information of the flight vehicle 300 from the flight vehicle position information acquisition unit 534, and control the irradiation direction of the light 102 emitted from the projector 520 in conformity to the flying direction of the flight vehicle 300. The control unit 210 may be an example of the irradiation direction control unit.

The control unit 536 may control the direction of the captive balloon 500 and the irradiation direction of light emitted from the projector 100, based on the projector position information and the flight vehicle position information. For example, when it is not possible to irradiate the flight vehicle 300 with the light 102 simply by controlling the irradiation direction of light emitted from the projector 520, the control unit 536 changes a direction of the captive balloon 500.

The cloud position information acquisition unit 542 acquires cloud position information indicative of a position of cloud between the projector 520 and the flight vehicle 300. For example, in a case where the captive balloon 500 includes a camera for capturing an area above the captive balloon, the cloud position information acquisition unit 542 analyzes an image captured by the camera to generate the cloud position information indicative of a position of cloud between the projector 520 and the flight vehicle 300. The cloud position information acquisition unit 542 also receives the cloud position information indicative of a position of the cloud between the projector 520 and the flight vehicle 300 from a weather information server that provides information about positions of clouds in each area, via the network 40 and the electric power transmission apparatus 20, for example.

In a case where the flight vehicle 300 has a function of detecting a position of cloud between the flight vehicle and the projector 520, the cloud position information acquisition unit 542 may receive the cloud position information from the flight vehicle 300. The cloud position information acquisition unit 542 receives the cloud position information from the flight vehicle 300, via the gateway 42, the network 40 and the electric power transmission apparatus 20, for example.

The control unit 536 may move the captive balloon 500, based on the cloud position information acquired by the cloud position information acquisition unit 222. In a case where a cloud exists between the projector 520 and the flight vehicle 300 and the light 102 emitted from the projector 520 is blocked by the cloud, for example, the control unit 536 moves the captive balloon 500 to a position at which the light 102 emitted from the projector 520 is not blocked by the cloud. The control unit 536 may be an example of the aircraft moving control unit.

The control unit 536 may move the flight vehicle 300, based on the cloud position information acquired by the cloud position information acquisition unit 222. In a case where a cloud exists between the projector 520 and the flight vehicle 300 and the light 102 emitted from the projector 520 is blocked by the cloud, for example, the control unit 536 moves the flight vehicle 300 to a position at which the light 102 emitted from the projector 520 is not blocked by the cloud. The control unit 536 may move the flight vehicle 300 by transmitting a moving instruction to the flight vehicle 300 via the electric power transmission apparatus 20, via the network 40 and the gateway 42, for example. The control unit 536 may be an example of the flight vehicle moving control unit.

The flight vehicle priority acquisition unit 544 acquires the priority of each of the plurality of flight vehicles 300. The control unit 536 may control the irradiation direction of the light 102 emitted from the projector 520, based on the priorities of the plurality of flight vehicles 300 acquired by the flight vehicle priority acquisition unit 544.

The light-receiving amount information acquisition unit 550 acquires light-receiving amount information indicative of the light-receiving amount received by the flight vehicle 300. The light-receiving amount information acquisition unit 550 may receive the light-receiving amount information indicative of the light-receiving amount received by the flight vehicle 300 from the flight vehicle 300, via the network 40. The light-receiving amount information acquisition unit 550 may also receive the light-receiving amount information indicative of the light-receiving amount received by the flight vehicle 300 from the management device 400, via the network 40. The control unit 536 may control the irradiation direction of the light 102 emitted from the projector 520, based on a relation between the irradiation direction of the light 102 emitted from the projector 520 and the light-receiving amount received by the flight vehicle 300. For example, the control unit 536 changes appropriately the irradiation direction of the light 102 emitted from the projector 520, specifies a relation with the light-receiving amount received by the flight vehicle 300 every change to specify an irradiation direction in which the light-receiving amount received by the flight vehicle 300 is the largest, and sets the irradiation direction of the light 102 emitted from the projector 520 to the specified irradiation direction.

Figure 10:
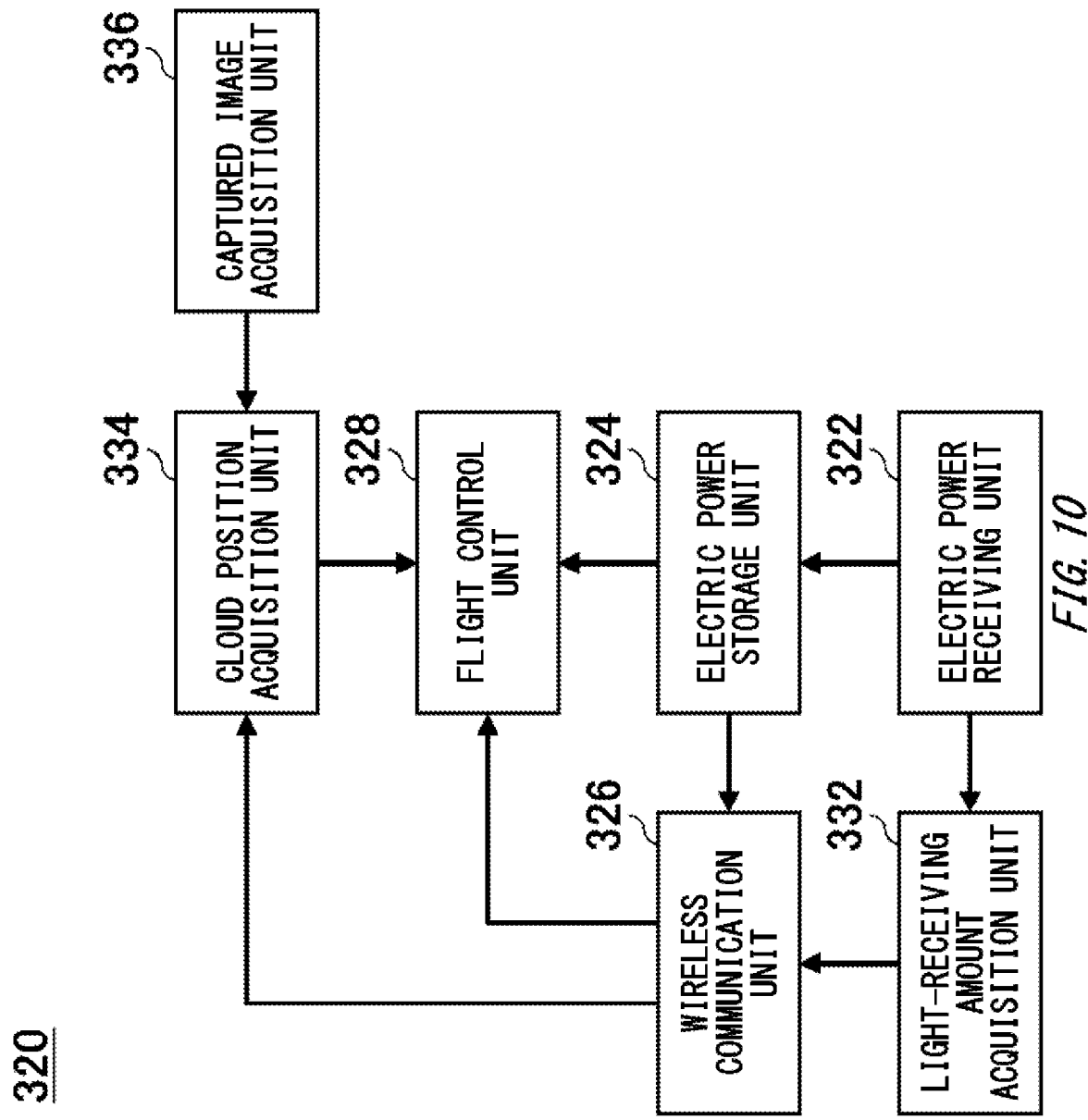
FIG. 10 shows schematically an example of a functional configuration of a control device 320 mounted on a flight vehicle 300.

FIG. 10 shows schematically an example of a functional configuration of a control device 320 mounted on the flight vehicle 300. The control device 320 comprises an electric power receiving unit 322, an electric power storage unit 324, a wireless communication unit 326, a flight control unit 328, a light-receiving amount acquisition unit 332, a cloud position acquisition unit 334, and a captured image acquisition unit 336. Note that, it is not essential that the control device 320 comprises all of the configurations.

The electric power receiving unit 322 receives electric power. The electric power receiving unit 322 may receive electric power generated by the solar cell panel 302. The electric power receiving unit 322 may also receive electric power generated by the solar cell panel 304.

The electric power storage unit 324 stores the electric power received by the electric power receiving unit 322. The electric power storage unit 324 is, as it is called, a secondary battery, a storage battery, a battery or the like, and may also be any kind of a battery such as a lithium ion battery and a lithium air battery.

The wireless communication unit 326 forms the communication area 310 on the ground by the antenna 308 and provides wireless communication service for the user terminal 60 in the communication area 310 by using the electric power stored in the electric power storage unit 324. The wireless communication unit 326 relays communication between the user terminal 60 and the network 40 via the gateway 42 in the communication area 310, for example.

The wireless communication unit 326 may communicate with the management device 400 via the gateway 42 in the communication area 310 and the network 40. The wireless communication unit 326 receives an instruction transmitted by the management device 400, for example. The wireless communication unit 326 may also communicate with the control device 200 via the gateway 42 in the communication area 310 and the network 40.

The flight control unit 328 controls flying of the flight vehicle 300. The flight control unit 328 may control flying of the flight vehicle 300 by using the electric power stored in the electric power storage unit 324. The flight control unit 328 controls flying of the flight vehicle 300 according to an instruction that is received by the wireless communication unit 326 from the management device 400, for example.

The light-receiving amount acquisition unit 332 acquires a light-receiving amount received by the solar cell panel 304. The light-receiving amount acquisition unit 332 may acquire light-receiving amount information indicative of a light-receiving amount from the solar cell panel 304. The light-receiving amount acquisition unit 332 may also acquire information indicative of an amount of electric power generated by the solar cell panel 304, as the information indicative of the light-receiving amount received by the solar cell panel 304. The wireless communication unit 326 may transmit light-receiving amount information indicative of the light-receiving amount acquired by the light-receiving amount acquisition unit 332 to the management device 400, the control device 200 and the like.

The cloud position acquisition unit 334 acquires the position of the cloud 52 existing below the flight vehicle 300. The cloud position acquisition unit 334 may acquire the position of the cloud 52 between the flight vehicle 300 and the projector 100. The cloud position acquisition unit 334 receives cloud position information indicative of the position of the cloud 52 between the flight vehicle 300 and the projector 100 from a weather information server that is equipped on the ground and provides information about positions of clouds in each area, via the network 40, the gateway 42, and the wireless communication unit 326.

The cloud position acquisition unit 334 also acquires the position of the cloud 52 between the projector 100 and the flight vehicle 300 by using a satellite photograph, for example. The cloud position acquisition unit 334 may receive a satellite photograph captured by a communication satellite from the communication satellite via the wireless communication unit 326. The flight vehicle 300 may include an antenna capable of communicating with the communication satellite, and the wireless communication unit 326 may communicate with the communication satellite via the antenna. The cloud position acquisition unit 334 may also receive the satellite photograph from an apparatus equipped on the ground, via the network 40 and the gateway 42. For example, the cloud position acquisition unit 334 receives the satellite photograph from an apparatus for collecting and managing satellite photographs, via the network 40 and the gateway 42.

The captured image acquisition unit 336 acquires a captured image of an area below the flight vehicle 300. The flight vehicle 300 may include an imaging unit capable of capturing an area below the flight vehicle, and the captured image acquisition unit 336 may acquire an image captured by the imaging unit.

The flight control unit 328 may specify a position at which light irradiated by the projector 100 can be received without being blocked by the clouds 52, from the position of the flight vehicle 300, the position of the projector 100, and the position of the cloud 52. The flight control unit 328 may cause the flight vehicle 300 to fly to the specified position.

Figure 11:
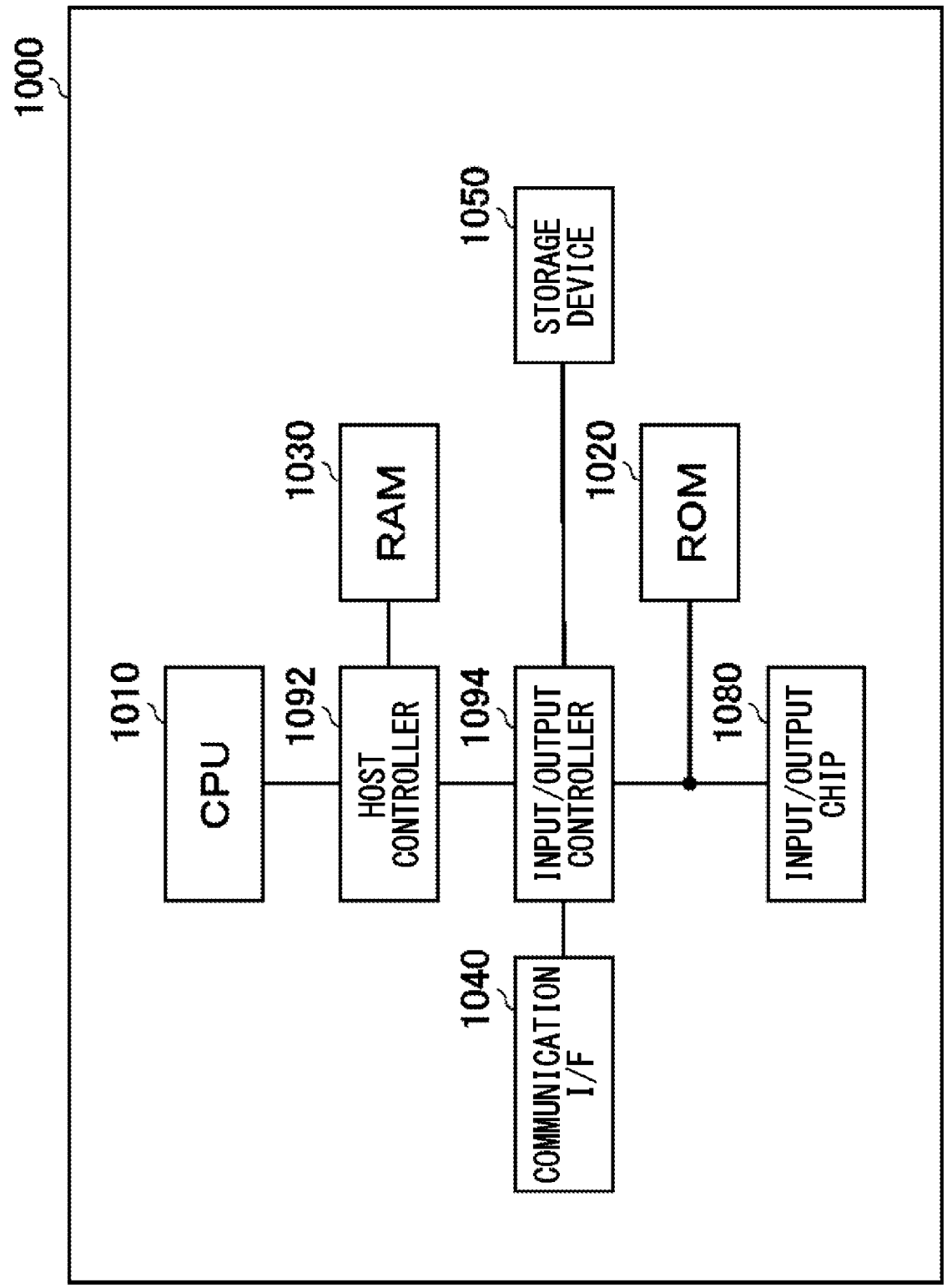
FIG. 11 shows schematically an example of a hardware configuration of a computer 1000 functioning as the control device 200 or the control device 530.

FIG. 11 shows schematically an example of a computer 1000 functioning as the control device 200 or the control device 530. The computer 1000 in accordance with the present embodiment includes a CPU peripheral unit including a CPU 1010 and a RAM 1030, which are mutually connected by a host controller 1092, and an input/output unit including a ROM 1020, a communication I/F 1040, a storage device 1050 and an input/output chip 1080, which are connected to the host controller 1092 by an input/output controller 1094.

The CPU 1010 operates based on programs stored in the ROM 1020 and the RAM 1030, thereby controlling each unit. The communication I/F 1040 communicates with other devices via the network. The communication I/F 1040 also functions as hardware for communication. The storage device 1050 may be a hard disk drive, a solid state disk, a solid state drive and the like, and stores programs and data that are used by the CPU 1010.

The ROM 1020 stores therein a boot program that is performed by the computer 1000 at the time of activation, and a program depending on the hardware of the computer 1000. The input/output chip 1080 connects various input/output units to the input/output controller 1094 via a USB port, a parallel port, a serial port, a keyboard port, a mouse port and the like.

The program that is provided to the storage device 1050 via the RAM 1030 is provided with being stored in a recording medium such as an IC card by a user. The program is read from the recording medium, installed into the storage device 1050 via the RAM 1030, and performed by the CPU 1010.

The program installed in the computer 1000 to cause the computer 1000 to function as the control device 200 or the control device 530 activates the CPU 1010 and the like to cause the computer 1000 to function as the respective units of the control device 200 or the control device 530. The information processing described in the programs functions as the projector position information acquisition unit 202, the flight vehicle position information acquisition unit 204, the control unit 210, the aircraft direction information acquisition unit 220, the cloud position information acquisition unit 222, and the flight vehicle priority acquisition unit 224, which are specific means in which software and various types of hardware resources cooperate with each other, as the programs are read into the computer 1000. The information processing described in the programs also functions as the projector position information acquisition unit 532, the flight vehicle position information acquisition unit 534, the control unit 536, the cloud position information acquisition unit 542, the flight vehicle priority acquisition unit 544, and the light-receiving amount information acquisition unit 550, which are specific means in which software and various types of hardware resources cooperate with each other, as the programs are read into the computer 1000. The specific means implements calculation or processing of information according to a use purpose of the computer 1000 of the present embodiment, so that the specific control device 200 or control device 530 is established according to the use purpose.

Figure 12:
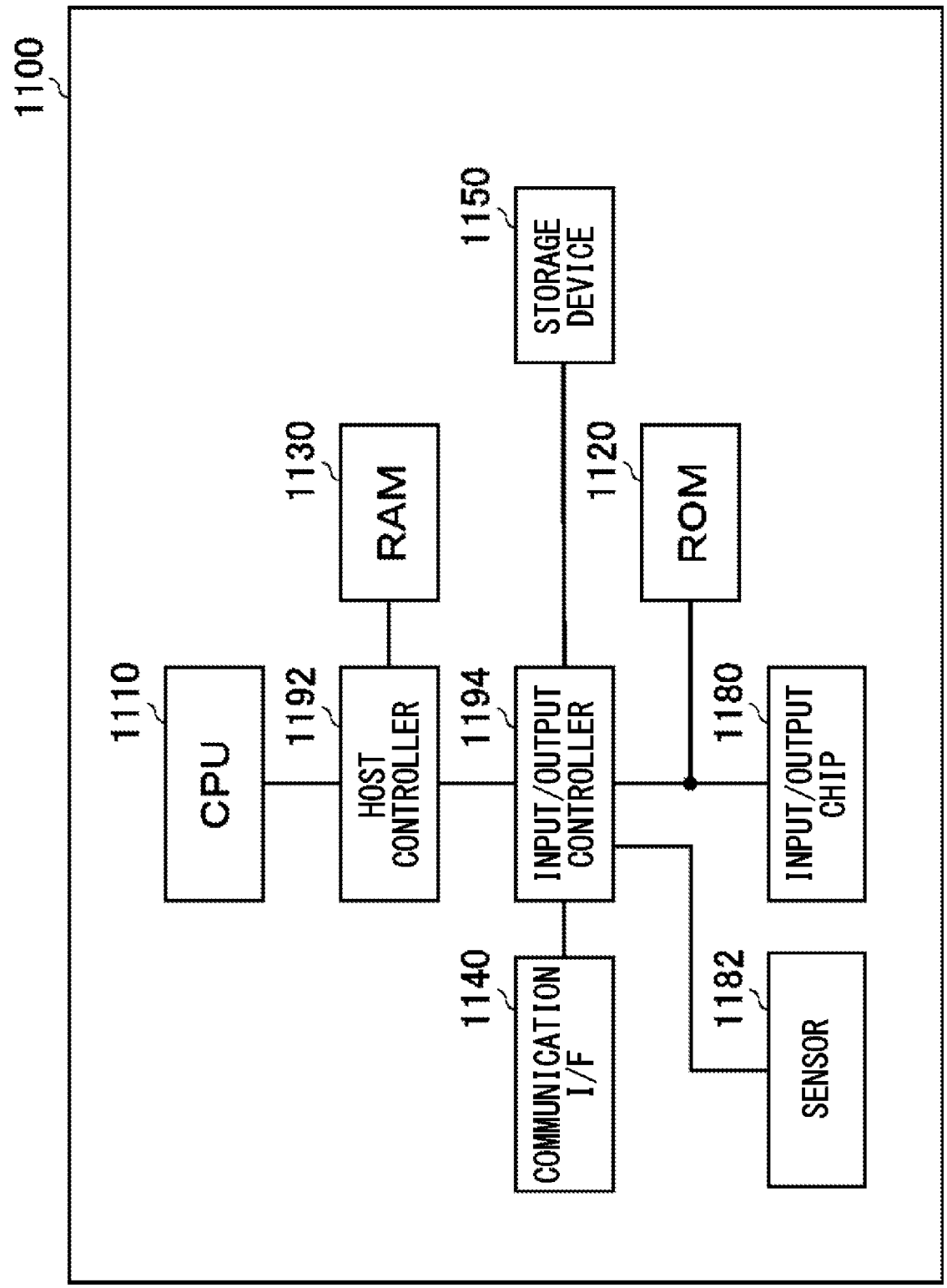
FIG. 12 shows schematically an example of a hardware configuration of a computer 1100 functioning as the control device 320.

FIG. 12 shows schematically an example of a computer 1100 functioning as the control device 320. The computer 1100 in accordance with the present embodiment includes a CPU peripheral unit including a CPU 1110 and a RAM 1130, which are mutually connected by a host controller 1192, and an input/output unit including a ROM 1120, a communication I/F 1140, a storage device 1150, an input/output chip 1180 and a sensor 1182, which are connected to the host controller 1192 by an input/output controller 1194.

The CPU 1110 operates based on programs stored in the ROM 1120 and the RAM 1130, thereby controlling each unit. The communication I/F 1140 communicates with other devices via the network. The communication I/F 1140 also functions as hardware for communication. The storage device 1150 may be a hard disk drive, a solid state disk, a solid state drive and the like, and stores programs and data that are used by the CPU 1110.

The ROM 1120 stores therein a boot program that is performed by the computer 1100 at the time of activation, and a program depending on the hardware of the computer 1100. The input/output chip 1180 connects various input/output units to the input/output controller 1194 via a USB port, a parallel port, a serial port, a keyboard port, a mouse port and the like. The sensor 1182 may be a sensor for detecting the light-receiving amount received by the solar cell panel 304. The sensor 1182 may also be a sensor for detecting an amount of electric power generated by the solar cell panel 304.

The program that is provided to the storage device 1150 via the RAM 1130 is provided with being stored in a recording medium such as an IC card by a user. The program is read from the recording medium, installed into the storage device 1150 via the RAM 1130, and performed by the CPU 1110.

The program installed in the computer 1100 to cause the computer 1100 to function as the control device 320 activates the CPU 1110 and the like to cause the computer 1100 to function as the respective units of the control device 320. The information processing described in the programs functions as the electric power receiving unit 322, the electric power storage unit 324, the wireless communication unit 326, the flight control unit 328, the light-receiving amount acquisition unit 332, the cloud position acquisition unit 334, and the captured image acquisition unit 336, which are specific means in which software and various types of hardware resources cooperate with each other, as the programs are read into the computer 1100. The specific means implements calculation or processing of information according to a use purpose of the computer 1100 of the present embodiment, so that the specific control device 320 is established according to the use purpose.

In the above embodiment, the case where the flight vehicle 300 functions as the stratosphere platform has been exemplified. However, the present invention is not limited thereto. The flight vehicle 300 may also be a so-called solar plane that includes the solar cell panel 302 and the solar cell panel 304 and flies by electric power generated by the solar cell panel 302 and the solar cell panel 304.

While the present invention have been described using the embodiments, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

10: system, 20: electric power transmission apparatus, 22: building, 30: cable, 40: network, 50: lower cloud, 52: cloud, 60: user terminal, 100: projector, 102: light, 200: control device, 202: projector position information acquisition unit, 204: flight vehicle position information acquisition unit, 210: control unit, 212: projector selection unit, 220: aircraft direction information acquisition unit, 222: cloud position information acquisition unit, 224: flight vehicle priority acquisition unit, 226: light-receiving amount information acquisition unit, 300: flight vehicle, 302: solar cell panel, 304: solar cell panel, 306: propeller, 308: antenna, 310: communication area, 312: sub-cell, 322: electric power receiving unit, 324: electric power storage unit, 326: wireless communication unit, 328: flight control unit, 332: light-receiving amount acquisition unit, 334: cloud position acquisition unit, 336: captured image acquisition unit, 400: management device, 500: captive balloon, 510: electric power receiving unit, 520: projector, 532: projector position information acquisition unit, 534: flight vehicle position information acquisition unit, 536: control unit, 542: cloud position information acquisition unit, 544: flight vehicle priority acquisition unit, 1000: computer, 1010: CPU, 1020: ROM, 1030: RAM, 1040: communication I/F, 1050: storage device, 1080: input/output chip, 1092: host controller, 1094: input/output controller, 1100: computer, 1110: CPU, 1120: ROM, 1130: RAM, 1140: communication I/F, 1150: storage device, 1180: input/output chip, 1182: sensor, 1192: host controller, 1194: input/output controller

What is claimed is:

1. A system comprising:
a projector; and
a control device, the system further comprising an aircraft mounted the projector thereon, wherein
the control device includes:
a projector position information acquisition unit for acquiring projector position information indicative of a position of the projector;
a flight vehicle position information acquisition unit for acquiring flight vehicle position information indicative of a position of a flight vehicle on which a first solar cell panel is mounted on an upper surface of the flight vehicle and a second solar cell panel is mounted on a lower surface of the flight vehicle, the flight vehicle separated by a distance from the aircraft; and
an irradiation direction control unit for controlling an irradiation direction of light emitted from the projector, based on the projector position information, the flight vehicle position information, and a light-receiving amount received by the flight vehicle from the projector;
wherein the first solar cell panel receives sunlight to generate electric power and the second solar cell receives irradiated light emitted from the projector to generate electric power.

2. The system according to claim 1, wherein the aircraft is a balloon or an airship.

3. The system according to claim 2, wherein the aircraft is a captive balloon.

4. The system according to claim 1, further comprising:
an aircraft direction information acquisition unit for acquiring aircraft direction information indicative of a direction of the aircraft, wherein
the irradiation direction control unit controls the irradiation direction of light emitted from the projector, based on the projector position information, the flight vehicle position information and the aircraft direction information.

5. A system comprising:
a projector; and
a control device, the system further comprising a plurality of projectors equipped on the ground, wherein
the control device includes:
a projector position information acquisition unit for acquiring projector position information indicative of a position of the projector;
a flight vehicle position information acquisition unit for acquiring flight vehicle position information indicative of a position of a flight vehicle on which a first solar cell panel is mounted on an upper surface of the flight vehicle and a second solar cell panel is mounted on a lower surface of the flight vehicle, the flight vehicle separated by a distance from the aircraft;
a projector selection unit for selecting a projector from the plurality of projectors, based on a position of cloud between each of the plurality of projectors and the flight vehicle, and
an irradiation direction control unit for controlling an irradiation direction of light emitted from the projector, based on the projector position information, the flight vehicle position information, and a light-receiving amount received by the flight vehicle, wherein the irradiation direction control unit controls an irradiation direction of light emitted from a projector selected by the projector selection unit, based on the projector position information of the projector selected by the projector selection unit, the flight vehicle position information, and a light-receiving amount received by the flight vehicle from the projector;
wherein the first solar cell panel receives sunlight to generate electric power and the second solar cell receives irradiated light emitted from the projector to generate electric power.

6. A control device comprising:
a projector position information acquisition unit for acquiring projector position information indicative of each position of a plurality of projectors equipped on the ground;
a flight vehicle position information acquisition unit for acquiring flight vehicle position information indicative of a position of a flight vehicle on which a first solar cell panel is mounted on an upper surface of the flight vehicle and a second solar cell panel is mounted on a lower surface of the flight vehicle, the flight vehicle separated by a distance from the aircraft;
a projector selection unit for selecting a projector from the plurality of projectors, based on a position of cloud between each of the plurality of projectors and the flight vehicle; and
an irradiation direction control unit for controlling an irradiation direction of light emitted from the projector, based on the projector position information, the flight vehicle position information, and a light-receiving amount received by the flight vehicle, wherein the irradiation direction control unit controls an irradiation direction of light emitted from a projector selected by the projector selection unit, based on the projector position information of the projector selected by the projector selection unit, the flight vehicle position information, and a light-receiving amount received by the flight vehicle from the projector;
wherein the first solar cell panel receives sunlight to generate electric power and the second solar cell receives irradiated light emitted from the projector to generate electric power.

7. A control device comprising:
a projector position information acquisition unit for acquiring projector position information indicative of a position of a projector;
a flight vehicle position information acquisition unit for acquiring flight vehicle position information indicative of a position of a flight vehicle on which a first solar cell panel is mounted on an upper surface of the flight vehicle and a second solar cell panel is mounted on a lower surface of the flight vehicle, the flight vehicle separated by a distance from the aircraft;

an irradiation direction control unit for controlling an irradiation direction of light emitted from the projector, based on the projector position information, the flight vehicle position information, and a light-receiving amount received by the flight vehicle from the projector;

a cloud position information acquisition unit for acquiring cloud position information indicative of a position of cloud between the projector and the flight vehicle, and a flight vehicle moving control unit for moving the flight vehicle, based on the cloud position information;

wherein the first solar cell panel receives sunlight to generate electric power and the second solar cell receives irradiated light emitted from the projector to generate electric power.

8. A control device comprising:

a projector position information acquisition unit for acquiring projector position information indicative of a position of a projector;

a flight vehicle position information acquisition unit for acquiring flight vehicle position information indicative of a position of a flight vehicle on which a first solar cell panel is mounted on an upper surface of the flight vehicle and a second solar cell panel is mounted on a lower surface of the flight vehicle, the flight vehicle separated by a distance from the aircraft;

a flight vehicle priority acquisition unit for acquiring a priority of each of a plurality of flight vehicles; and an irradiation direction control unit for controlling an irradiation direction of light emitted from the projector, based on the projector position information, the flight vehicle position information, and a light-receiving amount received by the flight vehicle from the projector, wherein the irradiation direction control unit controls the irradiation direction of light emitted from the projector, based on the priorities of the plurality of flight vehicles;

wherein the first solar cell panel receives sunlight to generate electric power and the second solar cell receives irradiated light emitted from the projector to generate electric power.

9. The system according to claim 1, wherein the control device receives light-receiving amount information indicative of the light-receiving amount received by the flight vehicle from the flight vehicle via a network.

* * * * *